(12) United States Patent
Shi et al.

(10) Patent No.: US 12,480,913 B2
(45) Date of Patent: Nov. 25, 2025

(54) ULTRASONIC MEASUREMENT METHOD FOR PLANE STRESS ON THE BASIS OF MULTI-WAFER AIR-COUPLED TRANSDUCER

(71) Applicant: Harbin Institute of Technology, Harbin (CN)

(72) Inventors: Weijia Shi, Harbin (CN); Bingquan Wang, Harbin (CN); Bo Zhao, Harbin (CN); Jiubin Tan, Harbin (CN)

(73) Assignee: Harbin Institute of Technology, Harbin (CN)

( * ) Notice: Subject to any disclaimer, the term of this patent is extended or adjusted under 35 U.S.C. 154(b) by 241 days.

(21) Appl. No.: 18/232,330

(22) Filed: Aug. 9, 2023

(65) Prior Publication Data

US 2024/0060935 A1    Feb. 22, 2024

(30) Foreign Application Priority Data

Aug. 16, 2022  (CN) .......................... 202210980454.4

(51) Int. Cl.
  *G01N 29/04* (2006.01)
  *G01N 29/07* (2006.01)
(52) U.S. Cl.
  CPC ........... *G01N 29/041* (2013.01); *G01N 29/07* (2013.01); *G01N 2291/011* (2013.01)
(58) Field of Classification Search
  None
  See application file for complete search history.

(56) References Cited

U.S. PATENT DOCUMENTS

| | | | |
|---|---|---|---|
| 7,302,851 B2* | 12/2007 | Czerw | G01N 29/28 73/620 |
| 2006/0058707 A1* | 3/2006 | Barthe | A61N 7/022 601/2 |
| 2016/0138180 A1* | 5/2016 | Kozawa | C25D 11/18 427/58 |

* cited by examiner

Primary Examiner — Suman K Nath
(74) Attorney, Agent, or Firm — IPro, PLLC

(57) ABSTRACT

An ultrasonic measurement method for plane stress on the basis of a multi-wafer air-coupled transducer relates to the technical field of ultrasonic testing. The method solves problems that a traditional measurement method for plane stress generally computes the plane stress by changing at least 3 different measurement directions and obtaining information such as an acoustic time difference in the 3 measurement directions by using a pair of contact ultrasonic transducers, which is too complicated in operation, and a coupling agent can influence measurement accuracy of the plane stress. The method includes: emitting, by an excitation signal transmission end, an ultrasonic wave passing a wafer of the multi-wafer air-coupled transducer to a member to be measured; receiving, by an excitation signal reception end, an echo returned from the member to be measured through a corresponding wafer of the multi-wafer air-coupled transducer; obtaining an acoustic time difference of lamb waves through data processing according to the ultrasonic wave and the echo; and obtaining first principal stress, second principal stress and an included angle between the first principal stress and a fiber direction of an orthotropic composite material according to the acoustic time difference of the lamb waves. The method is suitable for the field of plane stress testing.

6 Claims, 3 Drawing Sheets

ULTRASONIC MEASUREMENT METHOD FOR PLANE STRESS ON THE BASIS OF MULTI-WAFER AIR-COUPLED TRANSDUCER

TECHNICAL FIELD

The present invention relates to the technical field of ultrasonic testing, and particularly relates to a multi-wafer air-coupled transducer and an ultrasonic measurement method for plane stress on the basis of the multi-wafer air-coupled transducer.

BACKGROUND

In a long-term service process, an aircraft will inevitably suffer damage accumulation due to harsh working conditions, heavy loads, fatigue cycles and extreme temperature fluctuations. It may suffer sudden disintegration, crash or other serious accidents in severe cases, which causes inestimable losses. Therefore, it is an inevitable trend to ensure structural integrity of an aircraft and prolong its service life, irrespective of safety or economic benefits. A great number of studies have shown that factors having the greatest influence on flight safety of an aircraft during its service life are fatigue and corrosion. Both fatigue failure and stress corrosion are closely associated with existence of structural stress. Therefore, accurate assessment of an internal structural stress state is indispensable to improvement in reliability, maintainability, safety and support of an aircraft.

A great number of studies and applications have shown that ultrasonic testing is the most practical, effective and widely-used non-destructive testing technology at present. Air-coupled ultrasonic testing is non-destructive testing with air as a coupling agent. It is completely non-contact and pollution-free, and is more suitable for on-site measurement of a stress field of core components of an airframe. A traditional measurement method for plane stress generally computes the plane stress by changing at least 3 different measurement directions and obtaining information such as an acoustic time difference in the 3 measurement directions by using a pair of contact ultrasonic transducers, which is too complicated in operation. Moreover, since the contact ultrasonic transducers have to use a coupling agent, it is inconvenient to measure the plane stress. Meanwhile, a thickness of the coupling agent is difficult to control, such that measurement accuracy of the plane stress is influenced.

SUMMARY

The present invention solves problems that a traditional measurement method for plane stress generally computes the plane stress by changing at least 3 different measurement directions and obtaining information such as an acoustic time difference in the 3 measurement directions by using a pair of contact ultrasonic transducers, which is too complicated in operation, and measurement accuracy of the plane stress can be influenced when the contact ultrasonic transducers use a coupling agent.

The present invention provides a multi-wafer air-coupled transducer. The transducer includes:

six wafers, dual matching layers, and a backing layer.

Each wafer is fixed to an upper surface of the dual matching layers, and an upper surface of each wafer is attached to the backing layer.

The six wafers are uniformly distributed in the transducer in a circumferential direction. Any three adjacent wafers are configured to transmit an excitation signal, and the other three wafers are configured to receive an echo signal. Every two wafers having a consistent radial direction with a center of the transducer constitute a group of wafers.

Further, in a preferred embodiment, the transducer further includes:

an excitation signal reception end and an excitation signal transmission end. The wafers configured to transmit the excitation signal are connected to the excitation signal transmission end by means of wires, such that the excitation signal transmission end transmits the excitation signal to the wafers. The wafers configured to receive the echo signal are connected to the excitation signal reception end by means of wires, such that the echo signal is converted into an electrical signal, and the electrical signal is output from the excitation signal reception end.

Further, in a preferred embodiment, the wafers, the dual matching layers and the backing layer are all fixed in the housing; and the excitation signal reception end and the excitation signal transmission end are both fixed to an outer side of a housing.

The housing is a cylinder.

The present invention further provides an ultrasonic measurement method for plane stress on the basis of a multi-wafer air-coupled transducer. The method is implemented on the basis of the above transducer. The method includes:

transmitting, by the excitation signal transmission end, the excitation signal to the wafer configured to transmit the excitation signal, and converting, by the wafer, the received excitation signal into an ultrasonic signal and transmitting the ultrasonic signal to a member to be measured;

transmitting, by the member to be measured, the echo signal to the wafer configured to receive the echo signal, and converting, by the wafer, the received echo signal into a response signal and transmitting the response signal to the excitation signal reception end;

obtaining an acoustic time difference of lamb waves through data processing according to the ultrasonic signal and the echo signal; and computing first principal stress $\sigma_1$, second principal stress $\sigma_2$ and an included angle $\theta$ between the first principal stress and a fiber direction of an orthotropic composite material according to the acoustic time difference of the lamb waves.

Further, in a preferred embodiment, the obtaining an acoustic time difference of lamb waves through data processing according to the ultrasonic signal and the echo signal is specifically as follows:

$$T = -L/V_0^2)\Delta V.$$

L is a propagation path of the lamb waves in a measurement process, $V_0$ is an acoustic velocity of a measured material in a natural state, and $\Delta V$ is a variation of a propagation velocity of the lamb waves in any direction.

Further, in a preferred embodiment, the propagation path L of the lamb waves in the measurement process is obtained through a specific method as follows:

$$L = \frac{D}{2\cos\theta_T}\sqrt{1-4\sin^2\theta_T} - d\tan\theta_T.$$

D is a diameter of the multi-wafer air-coupled transducer, $\theta_T$ is an inclination angle of the wafer in the multi-wafer air-coupled transducer, and d is a distance between the multi-wafer air-coupled transducer and an upper surface of the member to be measured.

Further, in a preferred embodiment, the method further includes determining the inclination angle of the wafer in the multi-wafer air-coupled transducer, which specifically includes:

determining a phase velocity $c_p$ of an antisymmetrical mode under a specific frequency-thickness product according to a dispersion curve, and determining inclination angles $\theta_T$ and $\theta_R$ of the wafer in the multi-wafer air-coupled transducer by using the Snell law and an air acoustic velocity car as follows:

$$\theta_T = \theta_R = \arcsin\frac{c_{air}}{c_p}.$$

Further, in a preferred embodiment, the computing first principal stress $\sigma_1$, second principal stress $\sigma_2$ and an included angle $\theta$ between the first principal stress and a fiber direction of an orthotropic composite material according to the acoustic time difference of the lamb waves is specifically as follows: a first testing direction is 0°, a second testing direction is 60°, and a third testing direction is 120°.

$$A = \sigma_1 + \sigma_2 = \frac{(2a_2 - a_4)T_{0°} - (a_2 + a_4)(T_{60°} + T_{120°})}{(a_1 + a_3)(2a_2 - a_4) - (a_2 + a_4)(2a_1 - a_3)}$$

$$B = (\sigma_1 - \sigma_2)\cos2\theta = \frac{(2a_1 - a_3)T_{0°} - (a_1 + a_3)(T_{60°} + T_{120°})}{(a_2 + a_4)(2a_1 - a_3) - (a_1 + a_3)(2a_2 - a_4)}$$

$$C = (\sigma_1 - \sigma_2)\sin2\theta = \frac{T_{60°} + T_{120°}}{\sqrt{3}}$$

$$\sigma_1 = \frac{1}{2}\left(A + \sqrt{B^2 + C^2}\right)$$

$$\sigma_2 = \frac{1}{2}\left(A - \sqrt{B^2 + C^2}\right)$$

$$\theta = \frac{1}{2}\arctan\frac{C}{B}$$

A is a first parameter of an intermediate variable; B is a second parameter of an intermediate variable; C is a third parameter of an intermediate variable; $T_{0°}$ is an acoustic time difference in the first testing direction, $T_{60°}$ is an acoustic time difference in the second testing direction, $T_{120°}$ is an acoustic time difference in the third testing direction, and $a_1$, $a_2$, $a_3$ and $a_4$ are constants.

The present invention further provides a computer device, which includes a memory and a processor. The memory stores a computer program. When the processor runs the computer program stored in the memory, the processor executes the ultrasonic measurement method for plane stress on the basis of a multi-wafer air-coupled transducer according to any one of the above embodiments.

The present invention further provides a computer readable storage medium. The computer readable storage medium stores a computer program. The computer program executes the ultrasonic measurement method for plane stress on the basis of a multi-wafer air-coupled transducer according to any one of the above embodiments when being run by a processor.

The present invention has the beneficial effects:

The present invention solves problems that a traditional measurement method for plane stress generally computes the plane stress by changing at least 3 different measurement directions and obtaining information such as an acoustic time difference in the 3 measurement directions by using a pair of contact ultrasonic transducers, which is too complicated in operation, and the contact ultrasonic transducers can influence measurement accuracy of the plane stress.

The present invention provides the multi-wafer air-coupled transducer and the ultrasonic measurement method for plane stress on the basis of a multi-wafer air-coupled transducer. Different from the prior art, the multi-wafer air-coupled transducer and the ultrasonic measurement method for plane stress on the basis of the multi-wafer air-coupled transducer according to the present invention do not need to use a plurality of contact ultrasonic transducers, and measurement of the plane stress may be completed by using only one transducer. The method is more convenient and improves measurement efficiency of the plane stress.

The ultrasonic measurement method for plane stress on the basis of a multi-wafer air-coupled transducer according to the present invention does not need to manually change at least 3 different measurement directions for measurement, does not need to conduct rotation or other operations on the transducer, and may directly measure stress of the member to be measured and its zone by means of the multi-wafer air-coupled transducer, such that the measurement process is accelerated, time and labor are saved, and automation of measurement of the plane stress is achieved.

The ultrasonic measurement method for plane stress on the basis of a multi-wafer air-coupled transducer according to the present invention does not need to use a coupling agent, such that errors are reduced, operations are facilitated, and accuracy of a plane stress measurement result is higher.

The present invention is suitable for the field of plane stress testing.

DETAILED DESCRIPTION

In order to describe technical solutions and advantages of the present invention more clearly, several embodiments of the present invention are further described in details in conjunction with the accompanying drawings, but the embodiments described below are only some preferred embodiments of the present invention, which do not limit the present invention.

Figure 1:
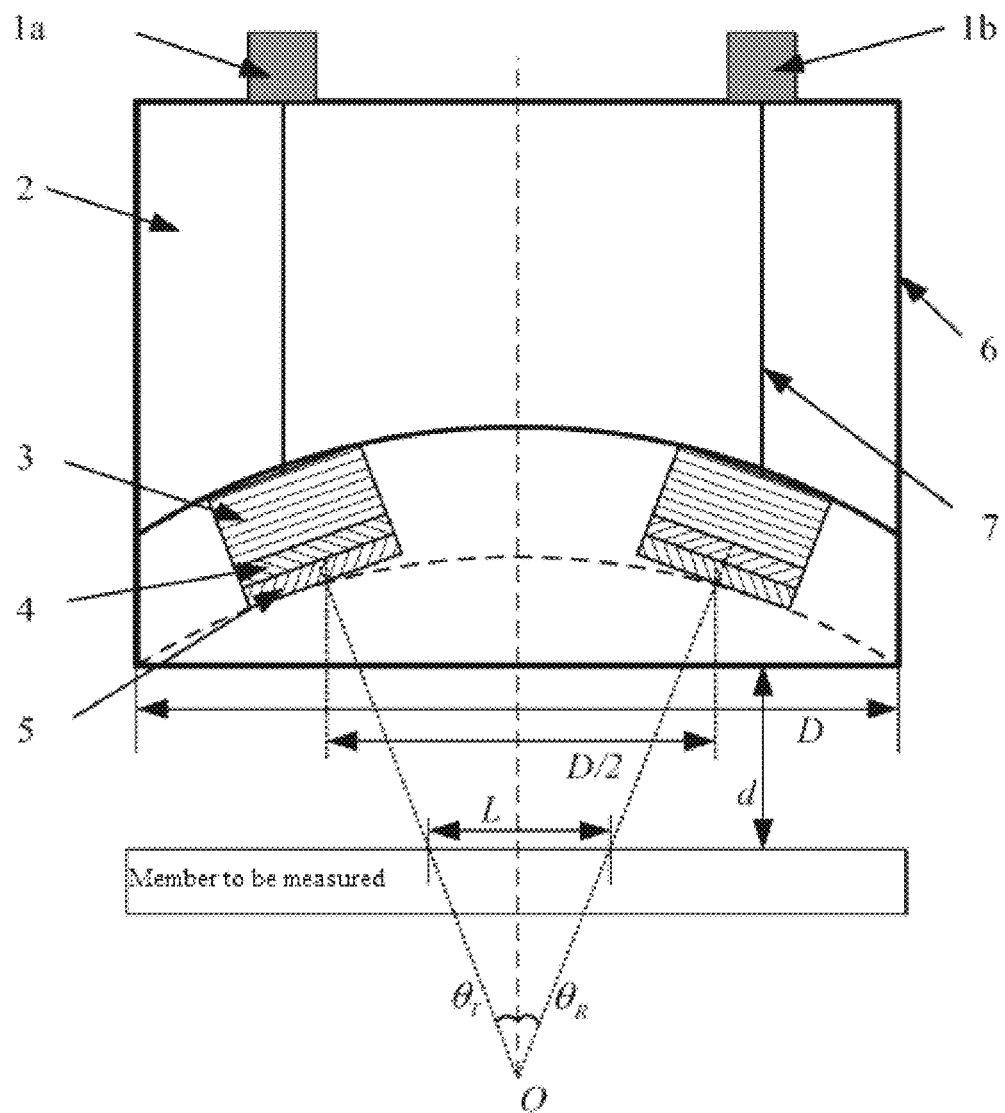
FIG. 1 is a schematic structural diagram of a cross section of a multi-wafer air-coupled transducer according to Embodiment 1. In the figure, 1a, excitation signal transmission end; 1b, excitation signal reception end; 2, backing layer; 3, wafer; 4, first matching layer; 5, second matching layer; 6, housing; 7, wire.
Figure 2:
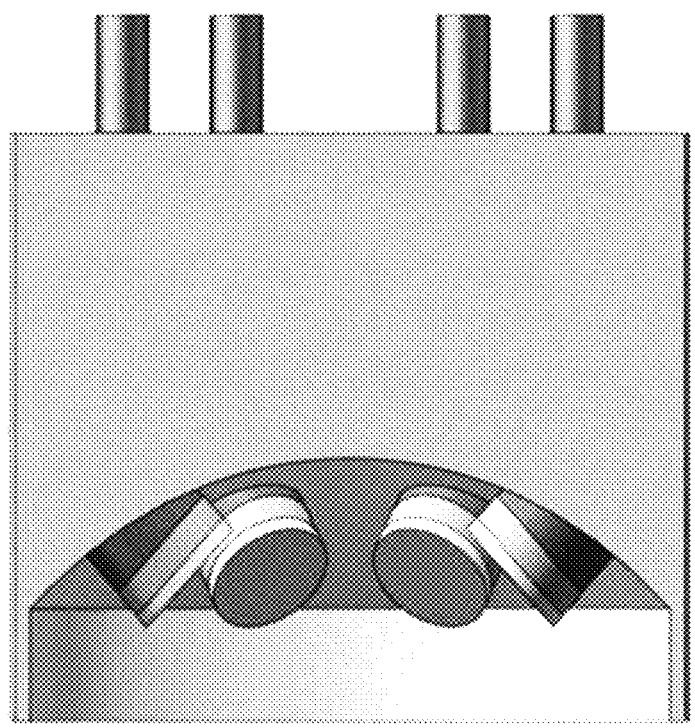
FIG. 2 is a solid diagram of a multi-wafer air-coupled transducer according to Embodiment 1.

Embodiment 1: the embodiment is described with reference to FIGS. 1-2. The embodiment describes a multi-wafer air-coupled transducer. The transducer includes:

six wafers 3, dual matching layers, and a backing layer 2.

The six wafers are uniformly distributed in the transducer in a circumferential direction. Any three adjacent wafers are configured to transmit an excitation signal, and the other three wafers are configured to receive an echo signal. Every two wafers having a consistent radial direction with a center of the transducer constitute a group of wafers.

The dual matching layers include a first matching layer 4 and a second matching layer 5.

Specifically, in order to excite a relatively pure lamb-wave mode, a dispersion curve of lamb waves is drawn by using material parameters of a material to be measured, a center frequency f of the multi-wafer air-coupled transducer is determined in conjunction with a thickness of the material to be measured, and a diameter, a thickness and other parameters of the wafer are determined according to the center frequency f of the multi-wafer air-coupled transducer. Materials and thicknesses of the dual matching layers are determined according to an optimal matching principle of the dual matching layers.

$$Z_1 = Z_0^{2/3} Z_3^{1/3}$$

$$Z_2 = Z_0^{1/3} Z_3^{2/3}$$

$Z_0$ is acoustic impedance of piezoelectric ceramics, $Z_1$ is acoustic impedance of the first matching layer, $Z_2$ is acoustic impedance of the second matching layer, and $Z_3$ is acoustic impedance of air.

According to the embodiment, the backing layer achieves unidirectional transmission of acoustic waves by attenuating the acoustic waves, so as to avoid interference of acoustic waves in other directions on propagation of front acoustic waves when the multi-wafer air-coupled transducer works.

According to the embodiment, a position of the wafer is fixed, such that the wafer may be directly used in stress testing without angle adjustment.

Embodiment 2: the embodiment further defines the multi-wafer air-coupled transducer according to Embodiment 1. The transducer further includes:

an excitation signal reception end and an excitation signal transmission end. The wafers configured to transmit the excitation signal are connected to the excitation signal transmission end by means of wires, such that the excitation signal transmission end transmits the excitation signal to the wafers. The wafers configured to receive the echo signal are connected to the excitation signal reception end by means of wires, such that the echo signal is converted into an electrical signal, and the electrical signal is output from the excitation signal reception end.

According to the embodiment, the wires 7 are configured to connect the wafers 3 to the excitation signal transmission end 1a and the excitation signal reception end 1b, such that stable response of the signals is ensured.

Embodiment 3: the embodiment further defines the multi-wafer air-coupled transducer according to Embodiment 1. The transducer further includes: the excitation signal reception end 1b, the excitation signal transmission end 1a, and a housing 6.

The wafers, the dual matching layers and the backing layer 2 are all fixed in the housing 6. The excitation signal reception end 1b and the excitation signal transmission end 1a are both fixed to an outer side of the housing 6. The housing 6 is a cylinder.

The embodiment further defines positions of the excitation signal reception end and the excitation signal transmission end. According to the embodiment, the position of the wafer is fixed, such that the wafer may be directly used in stress testing without angle adjustment.

Embodiment 4: the embodiment describes an ultrasonic measurement method for plane stress on the basis of a multi-wafer air-coupled transducer. The method is implemented on the basis of the transducer according to any one of Embodiments 1-3. The method includes the following steps: an excitation signal transmission end transmits an excitation signal to a first wafer, and the first wafer converts the received excitation signal into an ultrasonic signal and transmits the ultrasonic signal to a member to be measured;

the member to be measured transmits an echo signal to a second wafer, and the second wafer converts the received echo signal into an excitation signal and transmits the excitation signal to an excitation signal reception end;

an acoustic time difference of lamb waves is obtained through data processing according to the ultrasonic signal and the echo signal; and first principal stress $\sigma_1$, second principal stress $\sigma_2$ and an included angle $\theta$ between the first principal stress and a fiber direction of an orthotropic composite material are computed according to the acoustic time difference of the lamb waves.

Different from the prior art, the multi-wafer air-coupled transducer and the ultrasonic measurement method for plane stress on the basis of the multi-wafer air-coupled transducer according to the present invention do not need to use a plurality of contact ultrasonic transducers, and measurement of the plane stress may be completed by using only one transducer. The method is more convenient and improves measurement efficiency of the plane stress.

Specifically, in order to ensure that an acoustic beam has enough energy, the excitation signal is determined to be a sinusoidal pulse signal modulated by the hanning window and having a center frequency f and a cycle N, after passing a low pass filter, signals are sequentially applied to an excitation wafer of the multi-wafer air-coupled transducer through the excitation signal transmission end, and echoes of a corresponding reception wafer are sequentially obtained through the excitation signal reception end.

With the member to be measured of an orthotropic medium as an instance, a stress coefficient matrix $[\alpha_{ij}]$ is as follows:

$$[\alpha_{ij}] = \begin{bmatrix} \alpha_{11} & \alpha_{12} & \alpha_{13} & 0 & 0 & 0 \\ \alpha_{12} & \alpha_{22} & \alpha_{23} & 0 & 0 & 0 \\ \alpha_{13} & \alpha_{23} & \alpha_{33} & 0 & 0 & 0 \\ 0 & 0 & 0 & \alpha_{44} & 0 & 0 \\ 0 & 0 & 0 & 0 & \alpha_{55} & 0 \\ 0 & 0 & 0 & 0 & 0 & \alpha_{66} \end{bmatrix}$$

Regarding a plane stress issue in an XOY plane, a relation between a variation of a propagation velocity $\Delta V$ in any direction and principal plane stress is as follows:

$$\Delta V_\varphi = \frac{\alpha_{11} + \alpha_{22} + 2\alpha_{12}}{4}(\sigma_1 + \sigma_2) + $$
$$\frac{\alpha_{11} - \alpha_{22}}{4}(\sigma_1 - \sigma_2)\cos 2\theta + \frac{\alpha_{11} - \alpha_{22}}{4}(\sigma_1 + \sigma_2)\cos 2\varphi + $$
$$\frac{\alpha_{11} + \alpha_{22} - 2\alpha_{12}}{4}(\sigma_1 - \sigma_2)\cos 2\theta \cos 2\varphi + \frac{\alpha_{66}}{4}(\sigma_1 - \sigma_2)\sin 2\theta \sin 2\varphi$$

$\varphi$ is a measurement direction, $\sigma_1$ is first principal stress, $\sigma_2$ is second principal stress, and $\theta$ is an included angle between the first principal stress and a fiber direction of an orthotropic composite material.

Generally, in an actual testing process, a variation of an acoustic velocity is relatively slight, so direct measurement of the acoustic velocity may cause more errors. Therefore, the acoustic time difference T is introduced to transform measurement of the acoustic velocity into measurement of the acoustic time difference.

Embodiment 5: the embodiment further defines the ultrasonic measurement method for plane stress on the basis of a multi-wafer air-coupled transducer according to Embodiment 4. The step that the acoustic time difference of the lamb waves is obtained through data processing according to an ultrasonic wave and the echo is specifically as follows:

$$T = -(L/V_0^2)\Delta V.$$

L is a propagation path of the lamb waves in a measurement process, $V_0$ is an acoustic velocity of a measured material in a natural state, and $\Delta V$ is a variation of a propagation velocity of the lamb waves in any direction.

In order to simplify the formula, the following constants $a_1$, $a_2$, $a_3$ and $a_4$ are introduced:

$$a_1 = -(L/V_0^2)\frac{\alpha_{11} + \alpha_{22} + 2\alpha_{12}}{4}$$

$$a_2 = -(L/V_0^2)\frac{\alpha_{11} - \alpha_{22}}{4}$$

$$a_3 = -(L/V_0^2)\frac{\alpha_{11} + \alpha_{22} - 2\alpha_{12}}{8}$$

$$a_4 = -(L/V_0^2)\frac{\alpha_{66}}{4}.$$

Specifically, the embodiment provides an obtaining method for an acoustic time difference. By using a computing method described in the embodiment, the acoustic time difference of the lamb waves may be effectively obtained, such that stress testing is achieved.

Embodiment 6: the embodiment further defines the ultrasonic measurement method for plane stress on the basis of a multi-wafer air-coupled transducer according to Embodiment 5. The propagation path L of the lamb waves in the measurement process is obtained through a specific method as follows:

$$L = \frac{D}{2\cos\theta_T}\sqrt{1 - 4\sin^2\theta_T} - d\tan\theta_T.$$

D is a diameter of the multi-wafer air-coupled transducer, $\theta_T$ is an inclination angle of the wafer in the multi-wafer air-coupled transducer, and d is a distance between the multi-wafer air-coupled transducer and an upper surface of the member to be measured.

Specifically, the embodiment provides an obtaining method for the propagation path L.

Embodiment 7: the embodiment further defines the ultrasonic measurement method for plane stress on the basis of a multi-wafer air-coupled transducer according to Embodiment 4. The method further includes the step that the inclination angle of the wafer in the multi-wafer air-coupled transducer is determined, which specifically includes the following steps:

a phase velocity $c_p$ of an antisymmetrical mode under a specific frequency-thickness product is determined according to a dispersion curve, and inclination angles $\theta_T$ and $\theta_R$ of the wafer in the multi-wafer air-coupled transducer are determined by using the Snell law and an air acoustic velocity $c_{air}$ as follows:

$$\theta_T = \theta_R = \arcsin\frac{c_{air}}{c_p}.$$

Pure lamb waves have a symmetric mode $S_0$ and an antisymmetrical mode $A_0$. The symmetric mode has large in-plane displacement and the antisymmetrical mode has large out-plane displacement, such that the antisymmetrical mode $A_0$ is more suitable for reception and analysis of lamb waves leaked from one side, so as to achieve stress testing.

Embodiment 8: the embodiment further defines the ultrasonic measurement method for plane stress on the basis of a multi-wafer air-coupled transducer according to Embodiment 4.

The step that the first principal stress mi, the second principal stress $\sigma_2$ and the included angle $\theta$ between the first principal stress and the fiber direction of the orthotropic composite material are computed according to the acoustic time difference of the lamb waves is specifically as follows:

a first testing direction is 0°, a second testing direction is 60°, and a third testing direction is 120°.

$$A = \sigma_1 + \sigma_2 = \frac{(2a_2 - a_4)T_{0°} - (a_2 + a_4)(T_{60°} + T_{120°})}{(a_1 + a_3)(2a_2 - a_4) - (a_2 + a_4)(2a_1 - a_3)}$$

$$B = (\sigma_1 - \sigma_2)\cos 2\theta = \frac{(2a_1 - a_3)T_{0°} - (a_1 + a_3)(T_{60°} + T_{120°})}{(a_2 + a_4)(2a_1 - a_3) - (a_1 + a_3)(2a_2 - a_4)}$$

$$C = (\sigma_1 - \sigma_2)\sin 2\theta = \frac{T_{60°} - T_{120°}}{\sqrt{3}}$$

$$\sigma_1 = \frac{1}{2}\left(A + \sqrt{B^2 + C^2}\right)$$

$$\sigma_2 = \frac{1}{2}\left(A - \sqrt{B^2 + C^2}\right)$$

$$\theta = \frac{1}{2}\arctan\frac{C}{B}$$

A is a first parameter of an intermediate variable; B is a second parameter of an intermediate variable; C is a third parameter of an intermediate variable; $T_{0°}$ is an acoustic time difference in the first testing direction, $T_{60°}$ is an acoustic time difference in the second testing direction, and $T_{120°}$ in an acoustic time difference in the third testing direction. Specifically, A, B and C are abbreviated intermediate variables.

Specifically, the first principal stress $\sigma_1$, the second principal stress $\sigma_2$ and the included angle $\theta$ between the first principal stress and the fiber direction of the orthotropic composite material are computed according to the acoustic time difference of the lamb waves, and then the multi-wafer air-coupled transducer undergoes step-scan, such that plane stress of a zone to be measured of the member to be measured may be measured.

Embodiment 9: the embodiment describes a computer device, which includes a memory and a processor. The memory stores a computer program. When the processor runs the computer program stored in the memory, the processor executes the ultrasonic measurement method for plane stress on the basis of a multi-wafer air-coupled transducer according to any one of Embodiments 4-8.

Embodiment 10: the embodiment describes a computer readable storage medium. The computer readable storage medium stores a computer program. The computer program executes the ultrasonic measurement method for plane stress on the basis of a multi-wafer air-coupled transducer according to any one of Embodiments 4-8 when being run by a processor.

Figure 3:
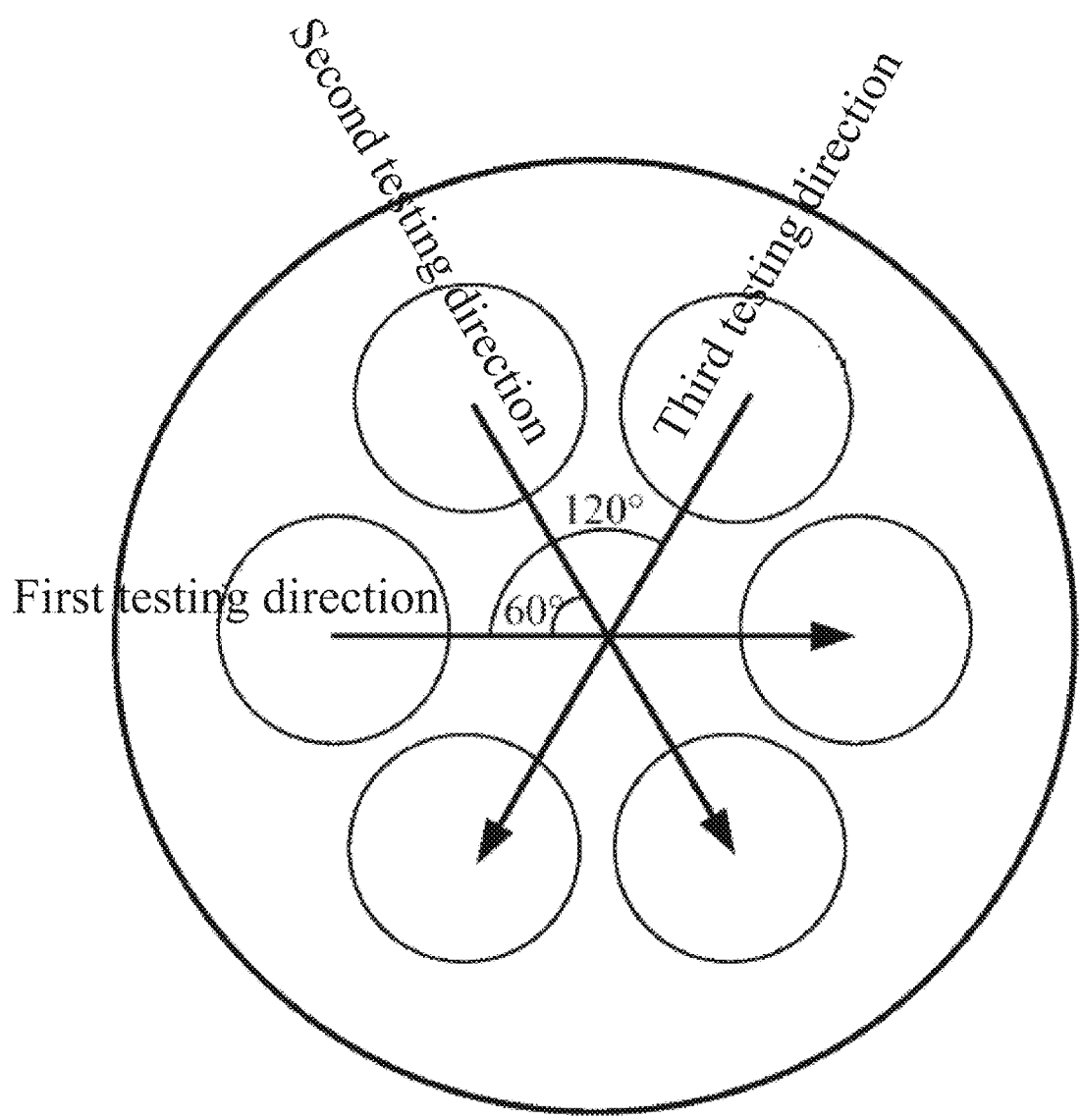
FIG. 3 is a schematic diagram of distribution of wafers of a multi-wafer air-coupled transducer according to Embodiment 11.

Embodiment 11: the embodiment is described with reference to FIG. 3. The embodiment provides a specific embodiment for Embodiment 4, and is further used for explaining Embodiments 4-8. Specifically:

in order to ensure that an acoustic beam has enough energy, the excitation signal is determined to be a sinusoidal pulse signal modulated by the hanning window and having a center frequency f and a cycle N, after passing a low pass filter, signals are sequentially applied to an excitation wafer of the multi-wafer air-coupled transducer through the excitation signal transmission end, and reception echoes of a corresponding reception wafer are sequentially obtained through the excitation signal reception end.

With the member to be measured of an orthotropic medium as an instance, a stress coefficient matrix is as follows:

$$[\alpha_{ij}] = \begin{bmatrix} \alpha_{11} & \alpha_{12} & \alpha_{13} & 0 & 0 & 0 \\ \alpha_{12} & \alpha_{22} & \alpha_{23} & 0 & 0 & 0 \\ \alpha_{13} & \alpha_{23} & \alpha_{33} & 0 & 0 & 0 \\ 0 & 0 & 0 & \alpha_{44} & 0 & 0 \\ 0 & 0 & 0 & 0 & \alpha_{55} & 0 \\ 0 & 0 & 0 & 0 & 0 & \alpha_{66} \end{bmatrix}$$

Regarding a plane stress issue in an XOY plane, a relation between a variation of a propagation velocity in any direction and principal plane stress is as follows:

$$\Delta V_\varphi = \frac{\alpha_{11}+\alpha_{22}+2\alpha_{12}}{4}(\sigma_1+\sigma_2) + \\ \frac{\alpha_{11}-\alpha_{22}}{4}(\sigma_1-\sigma_2)\cos2\theta + \frac{\alpha_{11}-\alpha_{22}}{4}(\sigma_1+\sigma_2)\cos2\varphi + \\ \frac{\alpha_{11}+\alpha_{22}-2\alpha_{12}}{4}(\sigma_1-\sigma_2)\cos2\theta\cos2\varphi + \frac{\alpha_{66}}{4}(\sigma_1-\sigma_2)\sin2\theta\sin2\varphi$$

$\varphi$ is a measurement direction, $\sigma_1$ is first principal stress, $\sigma_2$ is second principal stress, and $\theta$ is an included angle between the first principal stress and a fiber direction of an orthotropic composite material.

Generally, in an actual testing process, a variation of an acoustic velocity is relatively slight, so direct measurement of the acoustic velocity may cause more errors.

Therefore, the acoustic time difference T is introduced to transform measurement of the acoustic velocity into measurement of the acoustic time difference.

$$T = -(L/V_0^2)\Delta V$$

L is a propagation path of the lamb waves in a measurement process, $V_0$ is an acoustic velocity of a measured material in a natural state, and $\Delta V$ is a variation of a propagation velocity of the lamb waves in any direction.

If a distance between the multi-wafer air-coupled transducer and an upper surface of a member to be measured is d, L is:

$$L = \frac{D}{2\cos\theta_T}\sqrt{1-4\sin^2\theta_T} - d\tan\theta_T.$$

According to the above formula, a size of the propagation path L of the lamb waves in the measurement process may be adjusted by adjusting the distance between the multi-wafer air-coupled transducer and the upper surface of the member to be measured.

If a direction of a center connecting line of one group is a measurement direction of 0°, directions of center connecting lines of the other two groups are measurement directions of 60° and 120°, respectively. $\varphi1=0°$, $\varphi2=60°$, and $\varphi3=120°$.

An acoustic time difference formula and a formula of the propagation path of the lamb waves in the measurement process are combined as follows:

$$T_{0°} = -(L/V_0^2)\left[\frac{\alpha_{11}+\alpha_{22}+2\alpha_{12}}{4}(\sigma_1+\sigma_2) + \frac{\alpha_{11}-\alpha_{22}}{4}(\sigma_1-\sigma_2)\cos2\theta + \\ \frac{\alpha_{11}-\alpha_{22}}{4}(\sigma_1+\sigma_2) + \frac{\alpha_{11}+\alpha_{22}-2\alpha_{12}}{4}(\sigma_1-\sigma_2)\cos2\theta\right]$$

$$T_{60°} = -(L/V_0^2)\left[\frac{\alpha_{11}+\alpha_{22}+2\alpha_{12}}{4}(\sigma_1+\sigma_2) + \\ \frac{\alpha_{11}-\alpha_{22}}{4}(\sigma_1-\sigma_2)\cos2\theta - \frac{\alpha_{11}-\alpha_{22}}{8}(\sigma_1+\sigma_2) - \\ \frac{\alpha_{11}+\alpha_{22}-2\alpha_{12}}{8}(\sigma_1-\sigma_2)\cos2\theta + \frac{\sqrt{3}\alpha_{66}}{8}(\sigma_1-\sigma_2)\sin2\theta\right]$$

$$T_{120°} = -(L/V_0^2)\left[\frac{\alpha_{11}+\alpha_{22}+2\alpha_{12}}{4}(\sigma_1+\sigma_2) + \\ \frac{\alpha_{11}-\alpha_{22}}{4}(\sigma_1-\sigma_2)\cos2\theta - \frac{\alpha_{11}-\alpha_{22}}{8}(\sigma_1+\sigma_2) - \\ \frac{\alpha_{11}+\alpha_{22}-2\alpha_{12}}{8}(\sigma_1-\sigma_2)\cos2\theta - \frac{\sqrt{3}\alpha_{66}}{8}(\sigma_1-\sigma_2)\sin2\theta\right]$$

In order to simplify computation, the following constants $a_1$, $a_2$, $a_3$ and $a_4$ are introduced:

$$a_1 = -(L/V_0^2)\frac{\alpha_{11}+\alpha_{22}+2\alpha_{12}}{4}$$

$$a_2 = -(L/V_0^2)\frac{\alpha_{11}-\alpha_{22}}{4}$$

$$a_3 = -(L/V_0^2)\frac{\alpha_{11}+\alpha_{22}-2\alpha_{12}}{8}$$

$$a_4 = -(L/V_0^2)\frac{\alpha_{66}}{4}$$

which may be rewritten as:

$$T_{0°} = (a_1+a_3)(\sigma_1+\sigma_2) + (a_2+a_4)(\sigma_1-\sigma_2)\cos2\theta$$

$$T_{60°} = \left(a_1-\frac{1}{2}a_3\right)(\sigma_1+\sigma_2) + \left(a_2-\frac{1}{2}a_4\right)(\sigma_1-\sigma_2)\cos2\theta + \frac{\sqrt{3}}{2}(\sigma_1-\sigma_2)\sin2\theta$$

$$T_{120°} = \left(a_1-\frac{1}{2}a_3\right)(\sigma_1+\sigma_2) + \left(a_2-\frac{1}{2}a_4\right)(\sigma_1-\sigma_2)\cos2\theta - \frac{\sqrt{3}}{2}(\sigma_1-\sigma_2)\sin2\theta$$

The following may be obtained through formula combination:

$$A = \sigma_1 + \sigma_2 = \frac{(2a_2 - a_4)T_{0°} - (a_2 + a_4)(T_{60°} + T_{120°})}{(a_1 + a_3)(2a_2 - a_4) - (a_2 + a_4)(2a_1 - a_3)}$$

$$B = (\sigma_1 - \sigma_2)\cos 2\theta = \frac{(2a_1 - a_3)T_{0°} - (a_1 + a_3)(T_{60°} + T_{120°})}{(a_2 + a_4)(2a_1 - a_3) - (a_1 + a_3)(2a_2 - a_4)}$$

$$C = (\sigma_1 - \sigma_2)\sin 2\theta = \frac{T_{60°} - T_{120°}}{\sqrt{3}}$$

$$\sigma_1 = \frac{1}{2}\left(A + \sqrt{B^2 + C^2}\right)$$

$$\sigma_2 = \frac{1}{2}\left(A - \sqrt{B^2 + C^2}\right)$$

$$\theta = \frac{1}{2}\arctan\frac{C}{B}$$

The acoustic time differences of $T_{0°}$, $T_{60°}$ and $T_{120°}$ in 3 measurement directions are obtained by analyzing echoes received by 3 groups of wafers, and 3 parameters of plane stress of a measurement point (a projection point, of the member to be measured, corresponding to an intersection of center connecting lines of the 3 groups of wafers) are obtained in combination with the above formulas. $\sigma_1$ is the first principal stress, $\sigma_2$ is the second principal stress, and $\theta$ is the included angle between the first principal stress and the fiber direction of the orthotropic composite material. Then, the multi-wafer air-coupled transducer undergoes step-scan, such that plane stress of a zone to be measured of the member to be measured may be measured.

The present application is described in details above through specific embodiments, but the above descriptions are merely preferred embodiments of the present application, and are not intended to limit the present application. Any modifications, combinations of embodiments, equivalent replacements and improvements made within the spirit and principle of the present application should fall within the protection scope of the present application.

What is claimed is:

1. An ultrasonic measurement method for plane stress on the basis of a multi-wafer air-coupled transducer, wherein the transducer comprises six wafers, dual matching layers and a backing layer; each wafer is fixed to an upper surface of the dual matching layers, and an upper surface of each wafer is attached to the backing layer; the six wafers are uniformly distributed in the transducer in a circumferential direction, any three adjacent wafers are configured to transmit an excitation signal, the other three wafers are configured to receive an echo signal, and every two wafers having a consistent radial direction with a center of the transducer constitute a group of wafers; the transducer further comprises an excitation signal reception end and an excitation signal transmission end; the wafers configured to transmit the excitation signal are connected to the excitation signal transmission end by means of wires, such that the excitation signal transmission end transmits the excitation signal to the wafers; the wafers configured to receive the echo signal are connected to the excitation signal reception end by means of wires, such that the echo signal is converted into an electrical signal, and the electrical signal is output from the excitation signal reception end; the transducer further comprises a housing, and the wafers, the dual matching layers and the backing layer are all fixed in the housing; the excitation signal reception end and the excitation signal transmission end are both fixed to an outer side of the housing; the housing is a cylinder; and the method is implemented on the basis of the transducer, and the method comprises:

transmitting, by the excitation signal transmission end, the excitation signal to the wafer configured to transmit the excitation signal, and converting, by the wafer, the received excitation signal into an ultrasonic signal and transmitting the ultrasonic signal to a member to be measured;

transmitting, by the member to be measured, the echo signal to the wafer configured to receive the echo signal, and converting, by the wafer, the received echo signal into a response signal and transmitting the response signal to the excitation signal reception end;

obtaining an acoustic time difference of lamb waves through data processing according to the ultrasonic signal and the echo signal; and computing first principal stress $\sigma_1$, second principal stress $\sigma_2$ and an included angle $\theta$ between the first principal stress and a fiber direction of an orthotropic composite material according to the acoustic time difference of the lamb waves, wherein the computing first principal stress $\sigma_1$, second principal stress $\sigma_2$ and an included angle $\theta$ between the first principal stress and a fiber direction of an orthotropic composite material according to the acoustic time difference of the lamb waves is specifically as follows:

a first testing direction is 0°, a second testing direction is 60°, and a third testing direction is 120°; and $$A = \sigma_1 + \sigma_2 = \frac{(2a_2 - a_4)T_{0°} - (a_2 + a_4)(T_{60°} + T_{120°})}{(a_1 + a_3)(2a_2 - a_4) - (a_2 + a_4)(2a_1 - a_3)}$$

$$B = (\sigma_1 - \sigma_2)\cos 2\theta = \frac{(2a_1 - a_3)T_{0°} - (a_1 + a_3)(T_{60°} + T_{120°})}{(a_2 + a_4)(2a_1 - a_3) - (a_1 + a_3)(2a_2 - a_4)}$$

$$C = (\sigma_1 - \sigma_2)\sin 2\theta = \frac{T_{60°} - T_{120°}}{\sqrt{3}},$$

$$\sigma_1 = \frac{1}{2}\left(A + \sqrt{B^2 + C^2}\right)$$

$$\sigma_2 = \frac{1}{2}\left(A - \sqrt{B^2 + C^2}\right)$$

$$\theta = \frac{1}{2}\arctan\frac{C}{B},$$

wherein

A is a first parameter of an intermediate variable; B is a second parameter of an intermediate variable; C is a third parameter of an intermediate variable; $T_{0°}$ is an acoustic time difference in the first testing direction, $T_{60°}$ is an acoustic time difference in the second testing direction, $T_{120°}$ is an acoustic time difference in the third testing direction, and $a_1$, $a_2$, $a_3$ and $a_4$ are constants.

2. The ultrasonic measurement method for plane stress on the basis of a multi-wafer air-coupled transducer according to claim 1, wherein the obtaining an acoustic time difference of lamb waves through data processing according to the ultrasonic signal and the echo signal is specifically as follows:

$T = -(L/V_0^2)\Delta V$, wherein

L is a propagation path of the lamb waves in a measurement process, $V_0$ is an acoustic velocity of a measured material in a natural state, and $\Delta V$ is a variation of a propagation velocity of the lamb waves in any direction.

3. The ultrasonic measurement method for plane stress on the basis of a multi-wafer air-coupled transducer according to claim 1, wherein the propagation path L of the lamb waves in the measurement process is obtained through a specific method as follows:

$$L = \frac{D}{2\cos\theta_T}\sqrt{1-4\sin^2\theta_T} - d\tan\theta_T,$$

wherein
- D is a diameter of the multi-wafer air-coupled transducer, $\theta_T$ is an inclination angle of the wafer in the multi-wafer air-coupled transducer, and d is a distance between the multi-wafer air-coupled transducer and an upper surface of the member to be measured.

4. The ultrasonic measurement method for plane stress on the basis of a multi-wafer air-coupled transducer according to claim 1, further comprising determining the inclination angle of the wafer in the multi-wafer air-coupled transducer, which specifically comprises:
- determining a phase velocity $c_p$ of an antisymmetrical mode under a specific frequency-thickness product according to a dispersion curve, and determining inclination angles $\theta_T$ and $\theta_R$ of the wafer in the multi-wafer air-coupled transducer by using the Snell law and an air acoustic velocity $c_{air}$ as follows:

$$\theta_T = \theta_R = \arcsin\frac{c_{air}}{c_p}.$$

5. A computer device, comprising a memory and a processor, wherein the memory stores a computer program, and when the processor runs the computer program stored in the memory, the processor executes the ultrasonic measurement method for plane stress on the basis of a multi-wafer air-coupled transducer according to claim 1.

6. A non-transitory computer readable storage medium, storing a computer program, wherein the computer program executes the ultrasonic measurement method for plane stress on the basis of a multi-wafer air-coupled transducer according to claim 1 when being run by a processor.

* * * * *